Figure 1:
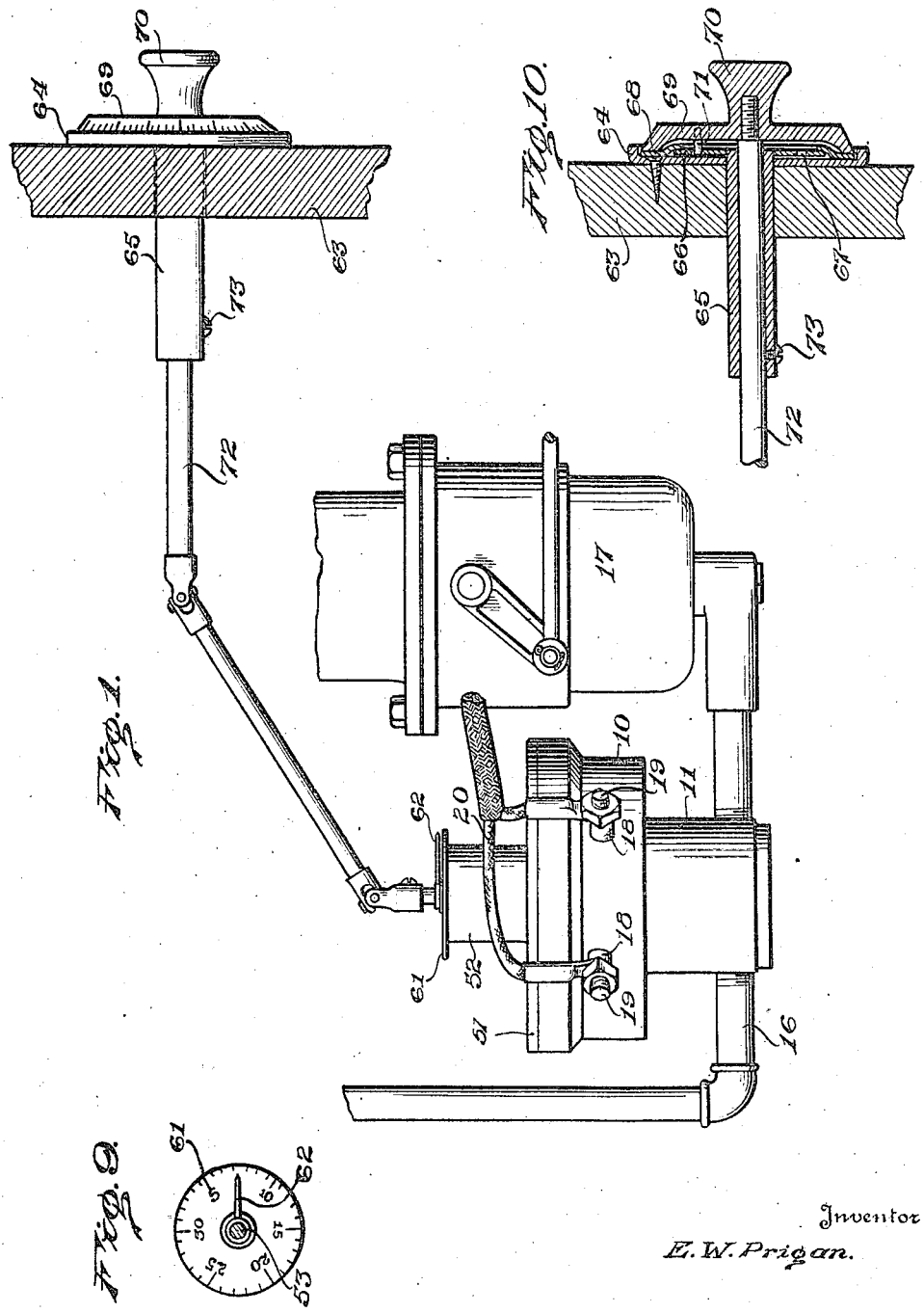

Sept. 30, 1924.  E. W. PRIGAN  1,510,417
LOCKING DEVICE FOR MOTOR VEHICLES
Filed April 29, 1922   3 Sheets-Sheet 1

Inventor
E. W. Prigan.

By Lacey & Lacey, Attorneys

Sept. 30, 1924.  
E. W. PRIGAN  
1,510,417  
LOCKING DEVICE FOR MOTOR VEHICLES  
Filed April 29, 1922    3 Sheets-Sheet 2

Inventor  
E. W. Prigan.  
By  
Lacey, Attorneys

Sept. 30, 1924.   E. W. PRIGAN   1,510,417
LOCKING DEVICE FOR MOTOR VEHICLES
Filed April 29, 1922   3 Sheets-Sheet 3
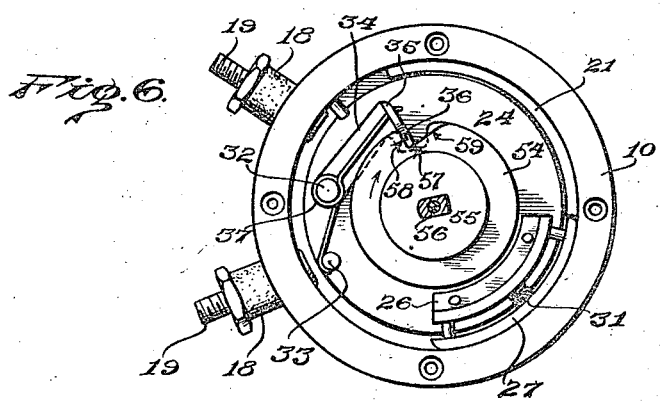
Fig. 6.
Fig. 11.
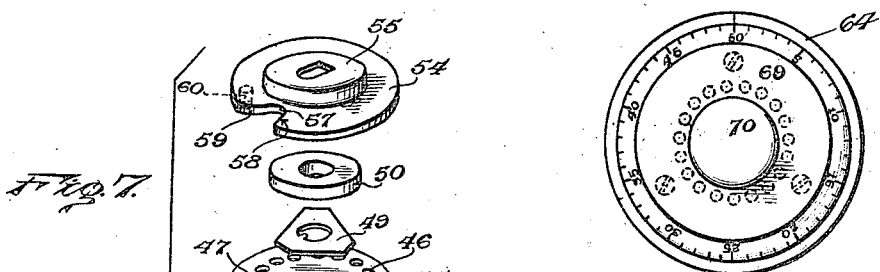
Fig. 7.   Fig. 8.
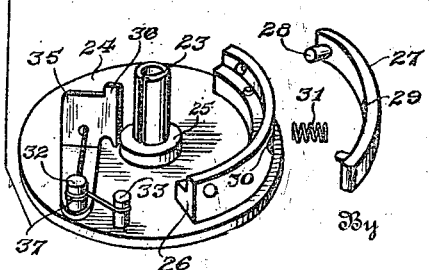
Inventor
E. W. Prigan.
By
Attorneys Patented Sept. 30, 1924.

1,510,417

UNITED STATES PATENT OFFICE.

ERNEST W. PRIGAN, OF BILLINGS, MONTANA, ASSIGNOR TO GAGE H. KAIN, OF BILLINGS, MONTANA.

LOCKING DEVICE FOR MOTOR VEHICLES.

Application filed April 29, 1922. Serial No. 557,473.

*To all whom it may concern:*

Be it known that I, ERNEST W. PRIGAN, a citizen of the United States, residing at Billings, in the county of Yellowstone and State of Montana, have invented certain new and useful Improvements in Locking Devices for Motor Vehicles, of which the following is a specification.

This invention relates to a combined fuel supply and starter lock for motor vehicles and seeks, as one of its principal objects, to provide a device whereby the starter circuit of a vehicle may be broken and the flow of fuel through the supply line to the engine carbureter simultaneously cut off to thus prevent theft or unauthorized use of the vehicle.

The invention has as a further object to provide a device embodying a starter circuit switch and a fuel supply line valve and wherein both the switch and valve may be simultaneously operated through the medium of a single lock mechanism.

A further object of the invention is to provide a device of this character embodying a lock mechanism of the permutation type and wherein the combination of the lock may be readily changed.

And the invention has as a still further object to provide a device embodying a dial operated control shaft therefor and wherein the combination employed in connection with the dial may be readily changed.

Other and incidental objects will appear hereinafter.

Figure 2:
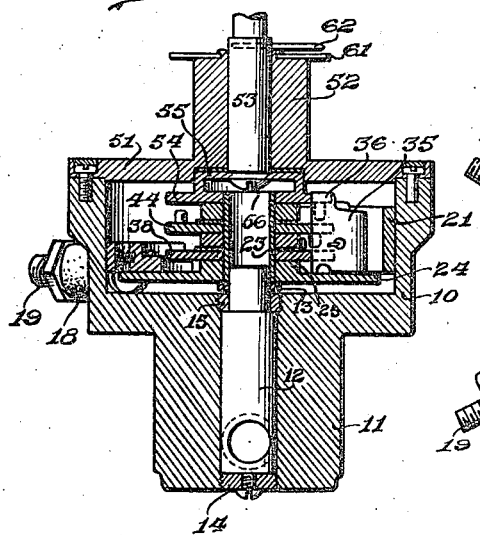
Figure 3:
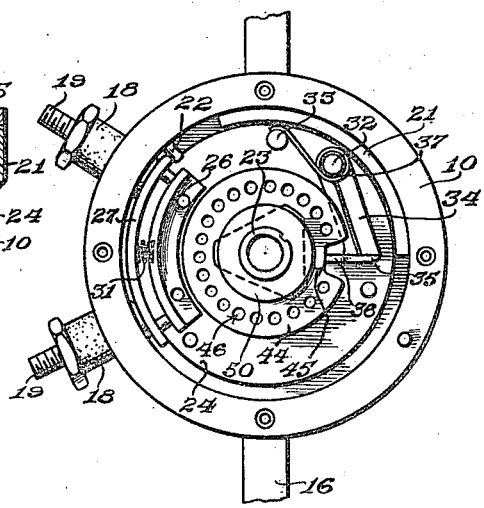
Figure 4:
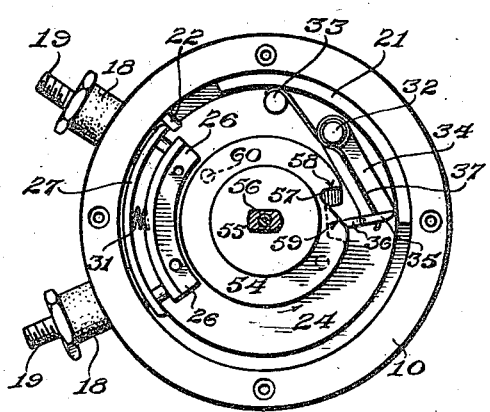
Figure 5:
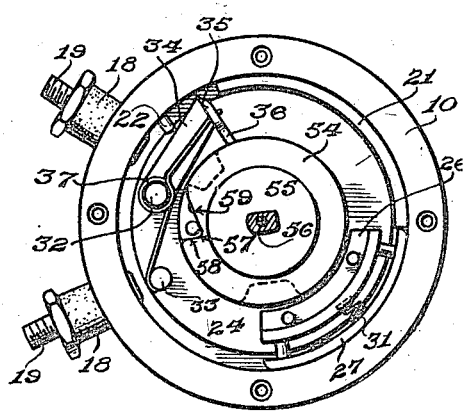

In the drawings:

Figure 1 is a fragmentary side elevation showing the improved device in connection with a conventional carbureter and fuel supply line of a motor vehicle, Figure 2 is a vertical sectional view through the device, Figure 3 is a plan view of the device with the cover removed, this view showing the position of the parts when the valve of the device is open and the switch is closed, Figure 4 is a view similar to Figure 3, showing the manner in which the tumbler wheel carrier of the device may be rotated for closing the valve and opening the switch, Figure 5 is a view similar to Figure 4 showing the position of the parts when the valve is closed and the switch is open, Figure 6 is a view similar to Figure 5 showing the manner in which the tumbler wheel may be rotated for closing the switch and opening the valve, Figure 7 is a perspective view showing the tumbler wheel carrier, tumbler wheels, and associated parts disassembled, Figure 8 is a fragmentary sectional view showing the mounting of the switch terminals upon the casing of the device, Figure 9 is a detail plan view of the master dial employed in connection with the device, Figure 10 is a detail sectional view showing the control dial of the device, and Figure 11 is a detail elevation of the index plate of the control dial.

In carrying the invention into effect, I employ a casing 10 provided at its lower side with a boss 11, and journaled in the boss is an axially disposed valve 12 having a reduced upper end projecting into the casing and carrying a cross pin 13. Supporting the valve at its lower end is a bushing 14 while a nut 15 is provided to limit the valve against upward movement, and formed in the boss 11 at opposite sides thereof are openings in which may be threaded the usual feed pipe 16 of a fuel supply line, the valve, of course, being adapted to control the flow of liquid fuel through said pipe. In Figure 1, I have conventionally shown a carbureter 17 which is fed by the pipe 16. Projecting radially from the wall of the casing at one side thereof, are spaced dielectric bushings 18 which, as shown in Figure 8, are threaded through the casing wall, and extending through said bushings are terminals 19 to the outer ends of which may be connected conventional circuit wires 20 forming a part of the starter circuit of the vehicle to which the device is attached. Mounted against the inner wall of the casing in spaced relation to the inner ends of said terminals is a segmental stop strip 21 and projecting into the casing adjacent one of said terminals is a stud 22.

Detachably mounted in the casing 10 is a rotatable carrier for the lock mechanism of the device including a tubular hub 23 upon the lower end portion of which is fixed a circular body plate or disc 24 having a central upstanding boss 25 surrounding the hub. As shown in Figure 2, the hub of the carrier is formed to fit over the upper reduced terminal of the valve 12 and is provided with notches accommodating the cross pin 13 of the valve so that the carrier is thus operatively coupled to the valve. Riveted or otherwise secured upon the body plate 24 of the carrier at one side thereof is a segmental angle strip 26 of suitable insulating material and mounted upon said strip is a segmental switch contact 27 provided near its ends with studs 28 freely received through suitable openings in the upstanding flange of the strip. At its inner side, the contact is, as particularly shown in Figure 7, provided with a socket 29 while the strip 26 is provided with a similar socket 30, and fitting at its ends in said sockets is a spring 31 pressing the contact radially outward. The contact will accordingly be held against the wall of the casing to ride thereover into engagement with the inner ends of the terminals 19, as shown in Figures 3 and 4 of the drawings, closing a circuit therethrough, the forward end of the contact being beveled to ride over said terminals. Upstanding from the body plate of the carrier in spaced relation to the strip 26 are posts 32 and 33 disposed near the periphery of the plate, and pivoted upon the post 32 is a dog 34 lying substantially opposite said strip. At its free end, the dog is, as most clearly seen in Figure 7, provided with an upstanding head 35 overhanging the shank of the dog at its inner longitudinal edge and upstanding from the head of the dog at its inner end is a lug 36. Surrounding the post 32 is a spring 37, one end of which extends through a suitable opening in the head 35 of the dog while the opposite end of said spring is arranged to coact with the post 33 so that the spring will thus act to swing the free end of the dog inwardly toward the hub of the carrier.

Freely mounted upon the hub 23 of the carrier to rest against the boss 25 thereof is a tumbler wheel 38 which, as shown in detail in Figure 7, is provided at one side thereof with a peripheral notch 39 and is further formed with an annular series of openings 40. Selectively engageable in these openings is an upstanding pin 41. Keyed upon the hub 23 to rest against the wheel 38 is a washer 42 upon which is imposed a spacing ring 43 surrounding the hub, and resting upon said ring is a tumbler wheel 44 which, like the tumbler wheel 38, is also loose on the hub. The wheel 44 is formed with a peripheral notch 45 similar to the notch 39 of the wheel 38 and is provided with an annular series of openings 46 in which are selectively engageable a depending pin 47 and an upstanding pin 48. Keyed upon the hub to rest against the wheel 44 is a washer 49, and overlying said washer is a spacing ring 50. As will be appreciated, the head 35 of the dog 32 will normally ride against the peripheries of the wheels 38 and 44 so that when the notches 39 and 45 of said wheels are brought into register, as shown in Figure 2, the head of the dog will drop into said notches.

Closing the casing is a cover 51 secured by a plurality of screws, the heads of which are countersunk in the cover and preferably covered by solder so as to prevent unauthorized removal of the cover. Rising from the cover centrally thereof is a boss 52 through which is journaled an operating shaft 53, and detachably fixed upon the inner end of said shaft is a disc-shaped head 54 from which rises a hood 55. This hood is freely accommodated in a suitable recess in the inner face of the cover while the shaft 53 is formed at its inner end with a squared terminal extending through the hood, and securing the head upon the shaft is a clamp screw 56 threaded into the shaft. The head is thus mounted to turn with the shaft and, as best shown in Figure 2, said head is formed with a central opening rotatably receiving the upper end of the hub 23 of the carrier so that the head thus serves to center the carrier within the casing. Formed in the periphery of the head at one side thereof is a notch 57, one wall of which provides a straight shoulder 58 while the other wall of said notch provides a cam face or shoulder 59, and depending from the head in spaced relation to said notch is a pin 60. Associated with the shaft 53 is a master dial including an index plate 61 mounted upon the upper end of the boss 52 and projecting from the shaft to cooperate with said plate is a pointer 62, the index plate being preferably numbered in the manner shown in Figure 9 of the drawings.

Mounted upon the dash or instrument board of the vehicle, conventionally shown at 63, is a control dial including a base plate 64 screwed or otherwise secured in position, and journaled through said plate is a sleeve 65 upon one terminal of which is fixed a plate 66 overlying the base plate 64, the sleeve being freely received through the part 63. The plate 66 is provided with an annular series of spaced openings 67 therein, and overlying the margin of said plate is a ring 68 suitably secured to the base plate 64 and rotatably connecting the sleeve 65 and plate 66 with the base plate. Fitting the base plate is an index plate 69 having a knob 70 and projecting from said plate at its inner side is a pin 71 selectively engageable in the openings 67 of the plate 66. Extending at its rear end through the sleeve 65 is a control shaft 72. This shaft is preferably formed of flexibly connected sections and at its forward end is secured to the upper end of the operating shaft 53 by a suitable universal joint. Securing the sleeve 65 to the shaft is a set screw 73 and, as will now be observed upon reference to Figure 10, the index plate 69 of the control dial is threaded upon the rear terminal of the shaft, the pin 71 being engaged in one of the openings 67 of the plate 66 for locking the index plate against displacement. Thus, the index plate 69 of the control dial may be rotated for turning the shaft 72 and rotating the operating shaft 53 of the device. To change the combination of the control dial, the set screw 73 is released when the shaft 72 is pushed rearwardly to disengage the pin 71 from the plate 66. The index plate may then be turned upon the shaft and the pin 71 engaged in a different one of the openings 67 for locking the index plate in a new position upon the shaft when the set screw 73 may then be again tightened so that the index plate and shaft will turn in unison.

Referring now more particularly to Figures 5 and 6 of the drawings, it will be assumed that the valve 12 of the device is closed and the switch open. To operate the device to close the switch and open the valve, the shaft 53 is turned in a clockwise direction whereupon the pin 60 upon the head 54 of said shaft will collide with the pin 48 upon the wheel 44 and the pin 47 upon said wheel will collide with the pin 41 upon the wheel 38 for turning both wheels with the head 54, thereby bringing the wheel 38 to a position having the notch 39 disposed opposite the head 35 of the dog 34. The shaft 53 is then turned in the opposite direction for rotating the wheel 44, as will be understood, to a position having its notch 45 registering with the notch 39. The shaft 53 is then counter-rotated to bring the notch 57 of the head 54 into register with the notches 45 and 39 when, as shown in Figure 6, the head 35 of the dog will drop into the registering notches of the wheels and the head. When this occurs, the upstanding lug 36 upon the head of the dog will be disposed in position in front of the shoulder 58 of the head 54 so that the shaft 53 may then be turned in a clockwise direction to engage said shoulder with the lug and, through the medium of the dog 34, rotate the carrier clockwise for opening the valve 12 and disposing the contact 27 of the switch across the inner ends of the terminals 19 closing the switch, the contact 27 engaging the stud 22 on the casing 10 for limiting the carrier in its rotative movement.

To again open the switch and close the valve, the shaft 53 is turned in a counter-clockwise direction when, as shown in Figure 4, the cam face 59 upon the head 54 of said shaft will ride against the lug 36 upon the head 35 of the dog 34 to swing the latter outwardly. However, as will be observed, outward movement of the dog will be blocked by the stop strip 21 so that the head of the dog will bear between said strip and the outer end of said cam face and prevent independent rotation of the head 54. Accordingly, when the head 54 is turned, the carrier will, through the medium of the dog, be rotated therewith to the position shown in Figure 5, for closing the valve and opening the switch, the head of the dog riding along the stop strip 21. As soon as the head of the dog clears said strip the dog will, as shown in Figure 5, swing further outward to release the head 54 so that the head will then turn independently of the carrier to ride the outer end of the cam face 59 against the lug 36 of the head of the dog and shift said head out of the registering notches of the wheels 38 and 44. Accordingly, the wheels will then be freed so that continued counter-rotation of the head 54 will cause the pin 60 of the head to collide with the pin 48 of the wheel 44 for rotating said wheel. Thus, the notch 45 of this wheel will be moved away from the head of the dog when, as will be understood, the shaft 53 may be further turned for rotating the wheel 38. The valve 12 will then be locked closed while the switch will be locked open and, of course, it will be impossible to again close the switch and open the valve except by proper rotation of the shaft 53 in accordance with a pre-determined combination. The master dial, comprising the index plate 61 and pointer 62, is provided for facilitating the setting of the device for a given combination and, as will be appreciated, the combination may be readily changed by shifting the pins 41, 47 and 48 of the wheels 38 and 44. I accordingly provide a highly efficient device for the purpose set forth and a device which will render the theft or unauthorized use of a motor vehicle highly improbable.

Having thus described the invention, what is claimed as new is:

In a locking device for motor vehicles, the combination of a controlling shaft, a fixed base plate around the end of said shaft, a plate resting against the base plate and having an annular series of openings concentric with the shaft, a ring engaging over the edge of the last-mentioned plate and holding it to the base plate, a dial plate secured on the shaft over the ring, and a pin carried by the dial plate and selectively engageable in the openings in the second-mentioned plate.

In testimony whereof I affix my signature.

ERNEST W. PRIGAN. [L. S.]